(12) United States Patent
Turchyn et al.

(10) Patent No.: US 11,045,677 B1
(45) Date of Patent: Jun. 29, 2021

(54) VAULTING POLE

(71) Applicant: Litania Sports Group, Inc., Champaign, IL (US)

(72) Inventors: James L. Turchyn, Urbana, IL (US); Gregory W. Luebbering, Heyworth, IL (US); Kenneth A. Hursey, Saint Joseph, IL (US); Bryan R. Carrel, Urbana, IL (US); Daniel S. Shenck, Champaign, IL (US); C. David Hodge, Mahomet, IL (US); Ralph W. Paquin, Jr., Farmer City, IL (US)

(73) Assignee: Litania Sports Group, Inc., Champaign, IL (US)

( * ) Notice: Subject to any disclaimer, the term of this patent is extended or adjusted under 35 U.S.C. 154(b) by 132 days.

(21) Appl. No.: 16/574,210

(22) Filed: Sep. 18, 2019

(51) Int. Cl.
*A63B 5/06* (2006.01)
*C03C 13/00* (2006.01)

(52) U.S. Cl.
CPC .............. *A63B 5/06* (2013.01); *C03C 13/00* (2013.01); *A63B 2209/023* (2013.01); *C03C 2213/00* (2013.01)

(58) Field of Classification Search
CPC ....... A63B 5/06; A63B 5/00; A63B 2209/023; C03C 13/00; C03C 2213/00
See application file for complete search history.

(56) References Cited

U.S. PATENT DOCUMENTS

| | | | | |
|---|---|---|---|---|
| 3,669,157 A * | 6/1972 | Woodall, Jr. | ............ | F16L 57/00 139/387 R |
| 3,969,557 A * | 7/1976 | Jenks | ........................ | A63B 5/06 428/34.5 |
| 4,333,643 A * | 6/1982 | Saffire | .................... | A63B 65/02 482/20 |
| 4,963,301 A * | 10/1990 | Davis | ...................... | C04B 35/82 264/29.7 |
| 5,035,764 A * | 7/1991 | Blake | ................. | B29D 99/0046 156/327 |
| 5,048,441 A * | 9/1991 | Quigley | .............. | B29C 53/8058 114/90 |
| 5,188,872 A * | 2/1993 | Quigley | .............. | B29C 53/8058 114/102.31 |
| RE35,081 E * | 11/1995 | Quigley | .................. | B29C 70/08 114/102.31 |
| 5,505,492 A * | 4/1996 | Nelson | ................... | B29C 33/505 280/819 |
| 5,534,203 A * | 7/1996 | Nelson | ................... | B29C 33/505 264/101 |
| 7,438,962 B1 * | 10/2008 | Watry | ....................... | A63B 5/06 428/190 |
| 8,221,109 B2 * | 7/2012 | Carlston | ................. | B29C 63/06 425/373 |
| 8,920,694 B2 * | 12/2014 | Carlston | ................. | B29C 63/06 264/173.1 |
| 2008/0128940 A1 * | 6/2008 | Carlston | ................. | B29C 63/06 264/165 |

(Continued)

*Primary Examiner* — Garrett K Atkinson
(74) *Attorney, Agent, or Firm* — Philip L. Bateman

(57) ABSTRACT

A vaulting pole has seven layers. The first layer is a helical E-glass tape, the second layer is a crosswise helical E-glass tape, the third layer is an UHP-glass body wrap, the fourth layer is an S-glass body wrap, the fifth layer is a carbon fiber body wrap, the sixth layer is an S-glass body wrap, and the seventh layer is an S-glass trapezoidal sail piece.

4 Claims, 3 Drawing Sheets

(56) References Cited

U.S. PATENT DOCUMENTS

| | | | |
|---|---|---|---|
| 2012/0277041 A1* | 11/2012 | Carlston | B29C 63/06 |
| | | | 473/578 |
| 2014/0335355 A1* | 11/2014 | Ettin | D01D 5/0885 |
| | | | 428/373 |
| 2014/0335752 A1* | 11/2014 | Ettin | B32B 5/26 |
| | | | 442/199 |
| 2019/0001607 A1* | 1/2019 | Boese | B32B 5/26 |
| 2019/0323993 A1* | 10/2019 | Mendes Rodrigues | |
| | | | G01N 29/40 |

* cited by examiner

VAULTING POLE

CROSS-REFERENCE TO RELATED APPLICATION

This application claims the benefit of U.S. Provisional Application Ser. No. 62/735,977, Sep. 25, 2018.

FIELD OF THE INVENTION

This invention relates to track and field equipment. More particularly, this invention relates to vaulting poles.

BACKGROUND OF THE INVENTION

1. Pole Vaulting In General

Track and field is a sport in which athletes compete in running, jumping, and throwing events. In an event known as the pole vault, an athlete uses a pole to jump over a cross bar. The pole vault originated in Europe where men used a wooden pole to jump over canals filled with water. By the late 1800s, the pole vault had been added as an event at track and field competitions. The early pole vaulters used a bamboo pole with a sharp point on the tip end and competed on a grassy surface. In the first modern Olympics in 1896, the winning vault was a height of ten and one-half feet. In the following century, techniques and equipment improved so dramatically that the current record is over twenty feet. One of the biggest improvements in equipment was the change to poles made of fiberglass.

Fiberglass vaulting poles are relatively light in weight. They also have the ability to bend a substantial amount as the vaulter plants the end of the pole into a box and then to straighten out to propel the vaulter over the cross bar. In terms of physics, the vaulting pole converts the kinetic energy of the vaulter into potential energy that is then used to overcome the force of gravity. The kinetic energy of the vaulter is equal to one-half of his mass times his velocity squared. To achieve the same optimal amount of bend, the pole used by a heavy vaulter must be stiffer than the pole used by a light vaulter. Accordingly, vaulting poles are manufactured for specific weight classes. If a vaulter uses a pole designed for a heavier vaulter, the pole will not bend enough. If a vaulter uses a pole designed for a lighter vaulter, the pole will bend too much. In either case, the vaulter will not be able to achieve the maximum height.

There is no limit to the length of the pole. The best male vaulters use a pole that is about seventeen feet long while high school girls may use a pole that is only about twelve feet long. Unless otherwise indicated expressly or by context, the term "about" is used herein to mean plus or minus 25 percent of the measurement or other quantified property referenced. Fiberglass poles of this length typically weigh about three to seven pounds. The weight of the pole has an effect on the speed the vaulter can achieve before planting the pole. As the pole becomes lighter, the vaulter can run faster. And because the height of the vault is a function of the kinetic energy generated by the vaulter and because the kinetic energy is a function of the velocity squared, any decrease in the weight of the pole is highly desirable.

2. Fiberglass Vaulting Poles

As previously discussed, modern vaulting poles are typically made of fiberglass. Fiberglass consists of glass fibers embedded in a matrix of a thermoplastic or a thermoset. Thermoplastics are polymeric materials that melt when heated and reform when cooled. Thermosets are polymeric materials such as epoxies, polyester resins, and vinylesters that decompose when heated and do not reform. The term "resin" is sometimes loosely used with all thermosets. The most widely used fiberglass is known as E fiberglass or E-glass. E fiberglass contains alumino-borosilicate glass fibers and has a tensile strength of about 2000 megapascals (MPa). A more expensive and stronger fiberglass is known as S fiberglass or S-glass. S fiberglass contains aluminosilicate glass fibers with a relatively high magnesium oxide content and has a tensile strength of about 2500 megapascals. An even more expensive and stronger fiberglass is known as UHP (ultra high performance) fiberglass or UHP-glass. UHP fiberglass is similar in composition to S fiberglass, but differs in physical properties due to a different sizing during production. The alternate sizing eliminates a heat cleaning step during production. UHP fiberglass has a tensile strength of about 7000 megapascals. All of these fiberglass materials are commercially available from a large number of manufacturers.

Fiberglass poles are manufactured by first wrapping multiple layers of fiberglass tape or cloth around a metal mandrel. The layers are numbered from the inside to the outside, in the order in which they are applied during manufacture. The terms "tape" and "cloth" are used somewhat arbitrarily in the industry depending on the width of the material. As used herein, the term "tape" refers to material having a width of three inches or less and the term "cloth" refers to material having a width of more than three inches. When a cloth is used, at least one circumference is made on the mandrel. The resulting layer of cloth is sometimes known as a body wrap. Body wraps are generally made from rectangular pieces of cloth and provide a constant thickness from end to end. Trapezoidal shaped cloths are sometimes known as sail pieces and are used to provide more thickness at the middle than at the ends.

The glass fibers in the material may run in only one direction or they may be woven to run in two directions, perpendicular to each other. Materials having fibers running in only one direction are commonly known as straight run or unidirectional. The direction in which the fibers run relative to the longitudinal axis of the pole determines the properties imparted to the pole. Fibers that run lengthwise (parallel to the longitudinal axis of the pole) provide column load bearing strength to the finished pole. Fibers that run radially (perpendicular to the longitudinal axis of the pole) provide hoop strength to the finished pole. Fibers that run at an angle between parallel and perpendicular provide both column load bearing strength and hoop strength. Fibers that run radially or at an angle, i.e., not parallel, are referred to herein as running transverse to the longitudinal axis.

After the layers of fiberglass are wrapped onto the mandrel, the pole is heated under pressure to cure (harden) the matrix material. The pole is then cooled and the mandrel removed. The pole is then cut to the desired length, caps are placed on the ends, and labels or the like are applied to the exterior of the pole. The manufacture of fiberglass vaulting poles is described in Jenks, U.S. Pat. No. 3,969,557, Jul. 13, 1976. The Jenks pole contains at least three layers of fiberglass—the first (inner) layer is a helically-wrapped fiberglass tape, the second (middle) layer is a fiberglass cloth body wrap, and the third (outer) layer is another helically-wrapped fiberglass tape. An optional fourth layer is a trapezoidal sail piece. The manufacture of composite vaulting poles and ski poles is also described in Nelson et al., U.S. Pat. No. 5,534,203, Jul. 9, 1996.

3. Carbon Fiber Vaulting Poles

In the late 1980s, straight run (unidirectional) carbon fiber tapes and sheets became commercially available. As the name implies, the carbon fibers in these materials run parallel to each other. For a given strength, carbon fibers weigh less than glass fibers. Straight run carbon tapes and sheets have substantial strength in only the direction of the fibers. As a result, they have been used as the helical tape and in straight body pieces where only one-dimensional strength is needed. Vaulting poles containing straight run carbon fibers typically weigh about ten percent less than a comparable pole made completely of E-fiberglass or S-fiberglass.

More recently, carbon weave materials became commercially available. Watry et al., U.S. Pat. No. 7,438,962, Oct. 21, 2008, discloses a vaulting pole made in part with carbon weave. Carbon weave vaulting poles have superior physical properties of weight and strength when new. FIG. 1 shows the five layers of material used to manufacture the Watry pole. The five layers are wrapped around a mandrel 10. The first layer 20 is fiberglass or straight run carbon fiber that is helically wrapped on the mandrel. The second layer 30 is fiberglass or straight run carbon fiber that is helically wrapped crosswise to the first layer. The third layer 40 is an inner body wrap of woven fiberglass or woven carbon cloth. The fourth layer 50 is a fiberglass or straight run carbon fiber trapezoidal sail piece. The fifth layer 60 is a fiberglass outer body wrap.

Various modifications to the Watry pole have since been made to achieve slightly different physical properties. Referring now to FIG. 2, one variation is a vaulting pole made of seven layers wrapped around a mandrel 110. The seven layers are a first layer of helical E-glass tape 120, a second layer of crosswise helical E-glass tape 130, a third layer of helical straight run carbon fiber tape 140, a fourth layer of S-glass body wrap 150, a fifth layer of straight run carbon fiber body wrap 160, a sixth layer of fiberglass body wrap 170, and a seventh layer of S-glass trapezoidal sail piece 180.

All types of vaulting poles occasionally break. In the case of vaulting poles containing at least one layer of carbon fiber, delamination (separation of the carbon fiber layer from the adjacent fiberglass layers) is the leading cause of breaks. While not wishing to be bound by theory, it is believed that this tendency to delaminate is due to the fact that carbon fibers have a different modulus of elasticity than that of glass fibers. Accordingly, there is a demand for a vaulting pole that has the superior physical properties of carbon vaulting poles and that is more resistant to delamination.

SUMMARY OF THE INVENTION

The general object of this invention is to provide an improved vaulting pole. A more particular object is to provide a vaulting pole that has the superior physical properties of carbon vaulting poles, namely the ten-percent weight reduction as compared to E-glass and S-glass vaulting poles, and that is more resistant to delamination than current carbon vaulting poles.

We have invented an improved vaulting pole. The vaulting pole comprises: (a) a first layer comprising a helical E-glass tape; (b) a second layer comprising a crosswise helical E-glass tape; (c) a third layer comprising a UHP-glass body wrap; (d) a fourth layer comprising an S-glass body wrap; (e) a fifth layer comprising a carbon fiber body wrap; (f) a sixth layer comprising an S-glass body wrap; and (g) a seventh layer comprising an S-glass trapezoidal sail piece.

The vaulting pole of this invention has the superior physical properties of carbon vaulting poles and is more resistant to delamination than current vaulting poles.

DETAILED DESCRIPTION OF THE INVENTION

1. The Mandrel

Figure 1:
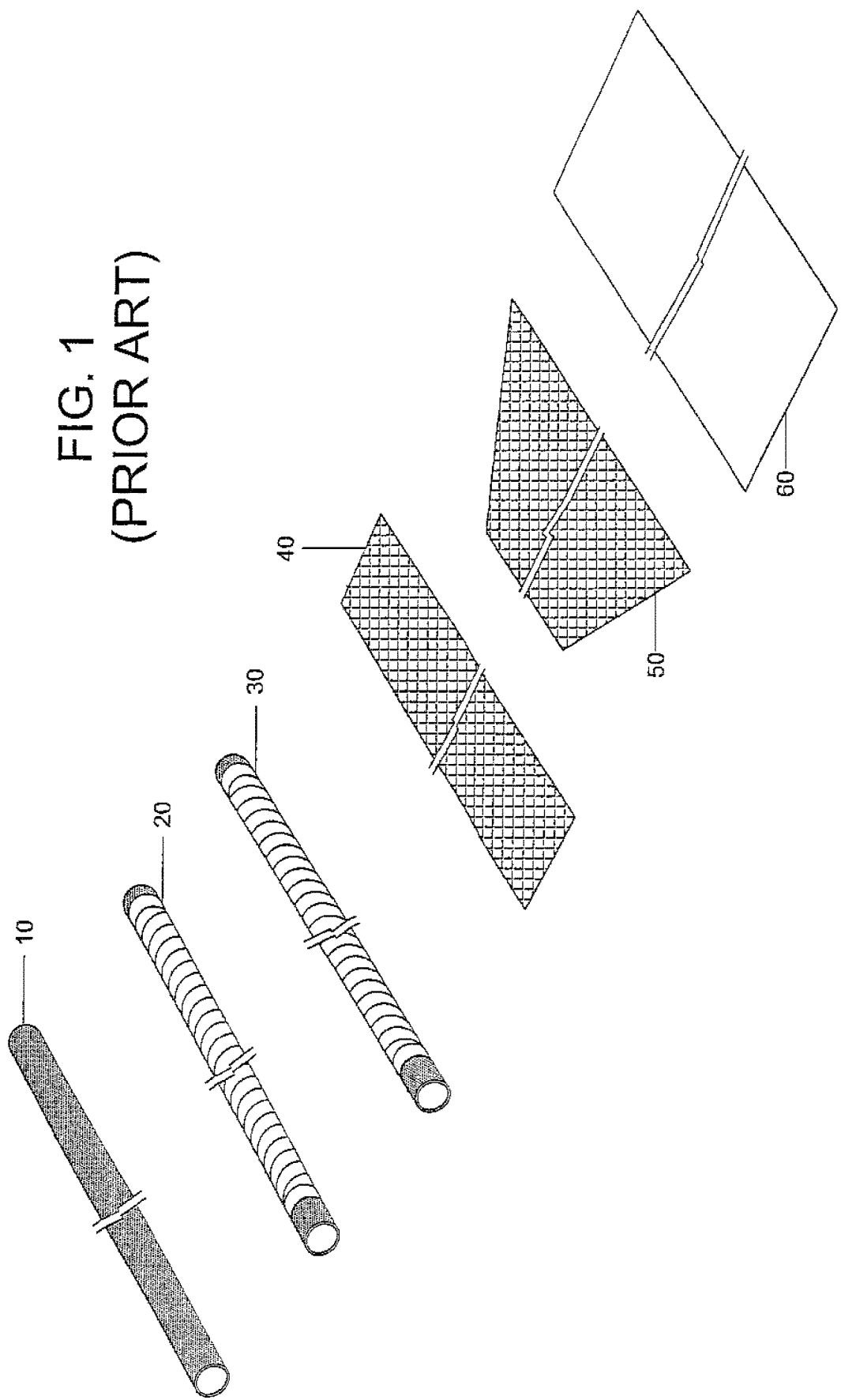
FIG. 1 is a perspective view of a mandrel and the five layers of material that are used to manufacture a prior art vaulting pole.
Figure 2:
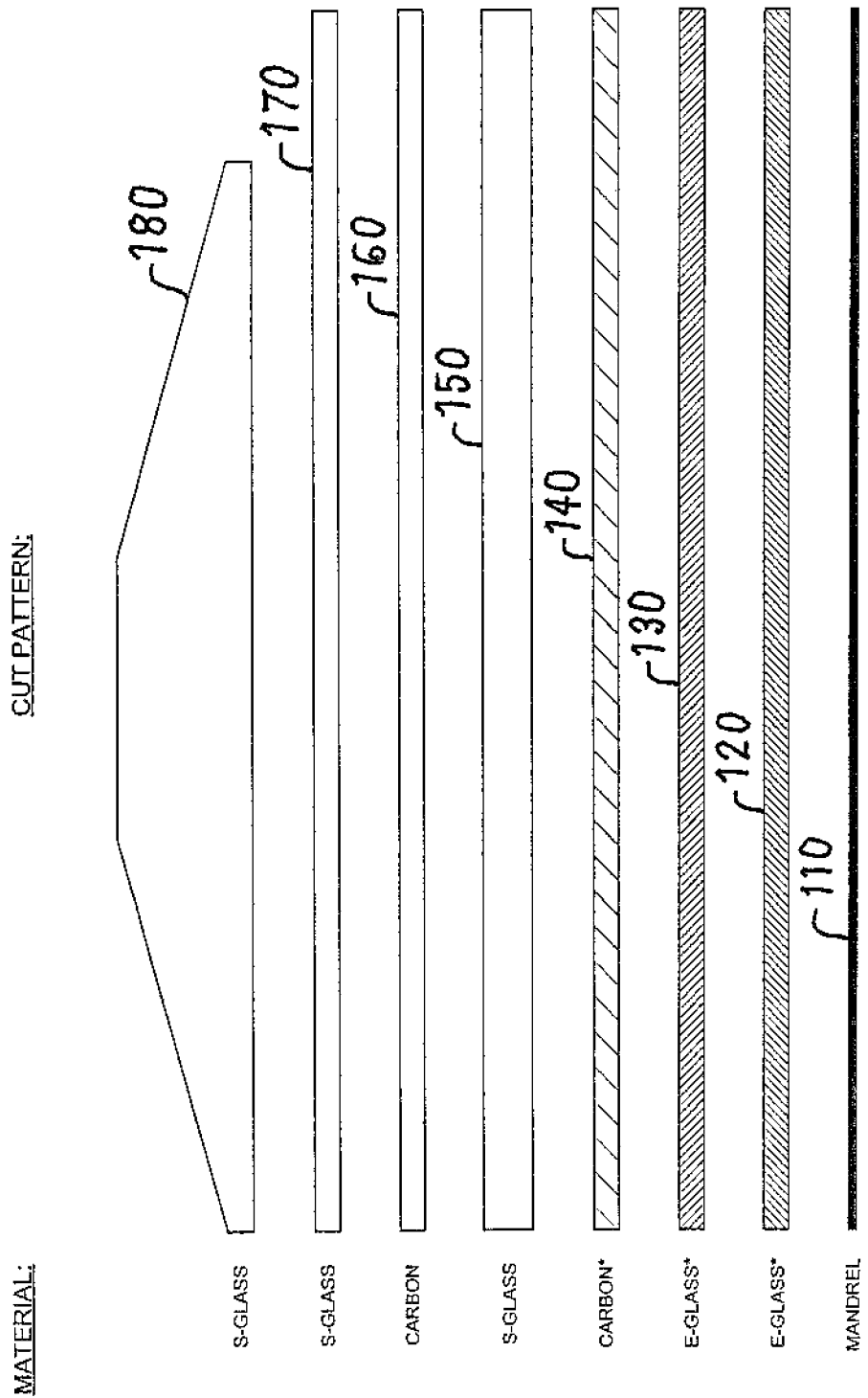
FIG. 2 is a top view of the seven layers of material used to manufacture a prior art vaulting pole.
Figure 3:
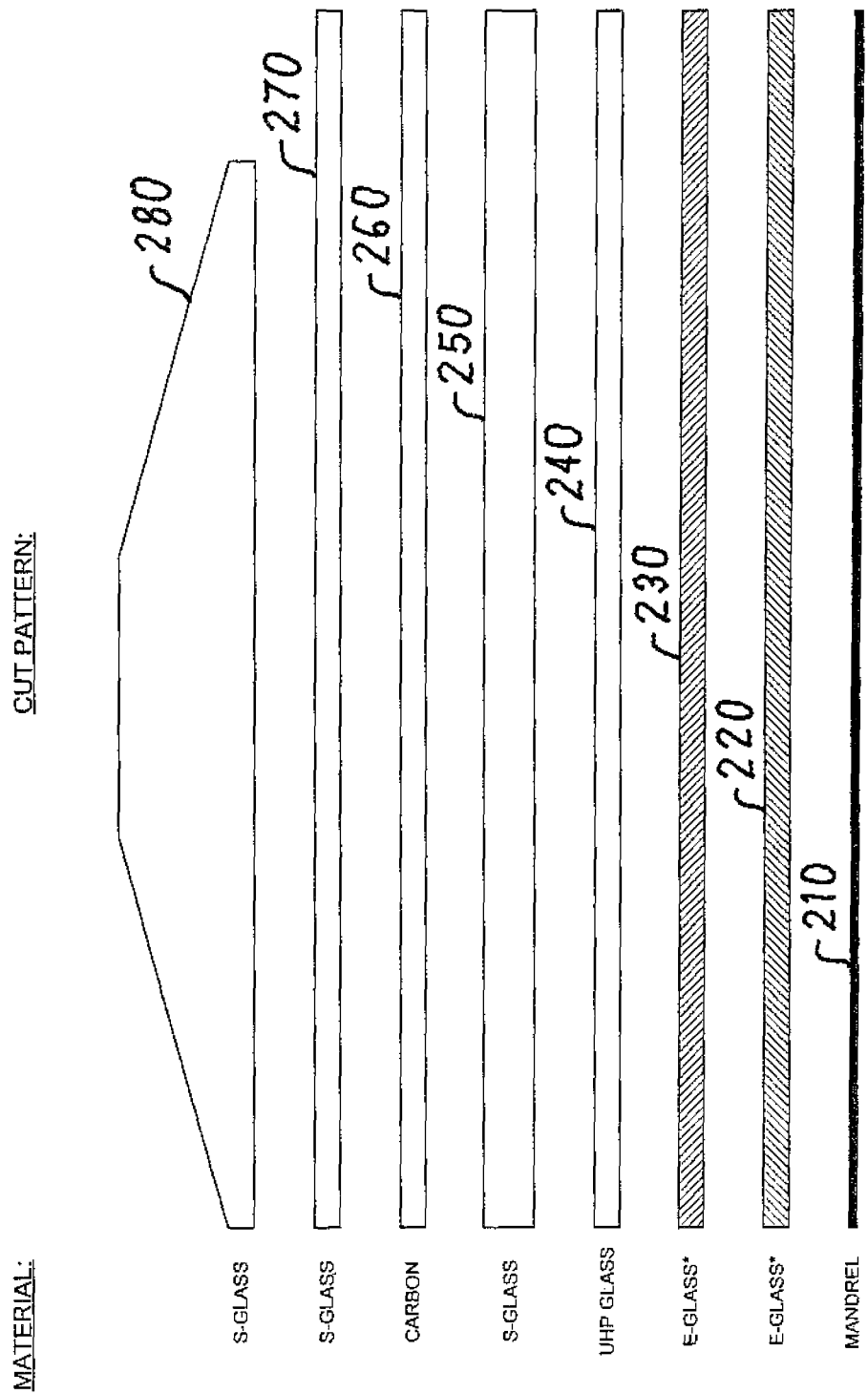
FIG. 3 is a top view of the seven layers of material used to manufacture a preferred embodiment of the vaulting pole of this invention.

This invention is best understood by reference to FIG. 3. The preferred embodiment of the vaulting pole 200 of this invention comprises seven layers of material that are applied to a mandrel 210, heated, cooled, and then separated from the mandrel. The pole is generally constructed to a length less than that of the mandrel. The pole is also generally constructed several inches longer than the desired length of the finished pole. The ends of the pole sometimes contain imperfections and the additional length allows the ends to be cut off. Caps are then placed on the ends. The mandrel is a metal pole having a length of about fifteen to eighteen feet and an outside diameter of about one to one and one-half inches. The mandrel is preferably tapered slightly so that it can be easily removed from within the finished pole.

2. The First Layer

The first layer 220 is made of fiberglass that is wrapped around the mandrel such that at least half of the glass fibers are transverse to the longitudinal axis of the pole. The layer is preferably tape that is helically wound upon the mandrel in one direction until the desired length is reached. The fiberglass is preferably E-glass.

3. The Second Layer

The second layer 230 is made of fiberglass that is wrapped around such that at least half of the glass fibers are transverse to the longitudinal axis of the pole. The layer is preferably tape that is helically wound upon the mandrel in the opposite direction of the first layer so that the tapes are crosswise to each other until the desired length is reached. The fiberglass is preferably E-glass.

4. The Third Layer

The third layer 240 is made of UHP fiberglass cloth. The cloth makes at least one circumference, preferably exactly one circumference. The cloth extends all or most of the length of the pole. The cloth preferably extends the entire length of the pole as shown in FIG. 3. As shown in the Examples below, it was surprisingly found that a single layer of UHP fiberglass, and especially as the third layer, provided optimal physical properties and durability. While not wishing to be bound by theory, it is believed that the single layer of UHP fiberglass as the third layer gives the fiberglass layers within the carbon fiber layer a modulus of elasticity that is similar to the modulus of elasticity of the carbon fiber layer.

5. The Fourth Layer

The fourth layer 250 is made of fiberglass cloth. The cloth makes at least one circumference, preferably exactly two circumferences, and preferably extends all or most of the length of the pole. The fiberglass is preferably S fiberglass.

6. The Fifth Layer

The fifth layer 260 is made of carbon fiber cloth. The carbon fiber cloth is preferably straight run, but woven carbon cloth is also suitable. The cloth makes at least one circumference, preferably exactly one circumference, and preferably extends all or most of the length of the pole.

7. The Sixth Layer

The sixth layer 270 is made of fiberglass cloth. The cloth makes at least one circumference, preferably exactly one circumference, and preferably extends all or most of the length of the pole. The fiberglass is preferably S fiberglass.

8. The Seventh Layer

The seventh layer 280 is made of fiberglass cloth. The cloth is preferably trapezoidal in shape. The base of the cloth is generally about 80 to 100 percent of the length of the inner layers. The top of the cloth is preferably about 5 to 50 percent the length of the base. The shape and position of the seventh layer are varied as desired to produce the desired physical characteristics in the pole. The fiberglass is preferably S fiberglass.

9. Properties And Advantages

The vaulting pole of this invention has the same weight as a comparable carbon weave vaulting pole and has similar flexing properties. The vaulting pole of this invention is very resistant to delamination.

10. Other Embodiments

The preferred embodiment described above contains two layers of E fiberglass tape (the first and second layers) inside the UHP fiberglass cloth. If desired, fewer or additional layers of fiberglass are added inside the UHP fiberglass cloth. The preferred embodiment contains two layers of fiberglass cloth (the sixth and seventh layers) outside the carbon fiber cloth. If desired, fewer or additional layers of fiberglass are added outside the carbon fiber cloth.

11. Examples

The following examples are illustrative only.

Example 1

This example illustrates the effect of the choice of material for the third layer on a vaulting pole made from seven layers of material.

Six poles were made. Each pole had seven layers of material. The first two layers were identical. Each pole had a first layer of helical E-glass tape and a second layer of crosswise helical E-glass tape. The fourth through seventh layers were also identical. Each pole had a fourth layer of S-glass body wrap, a fifth layer of carbon fiber body wrap, a sixth layer of S-glass body wrap, and a seventh layer of S-glass trapezoidal sail piece.

The first pole had a third layer of UHP-glass. The finished pole had exceptional physical properties and durability.

The second pole had a third layer of aramid. This pole was unsatisfactory because it took a permanent set each time it was bent. In other words, it did not return to its original straight shape.

The third pole had a third layer of spread tow carbon fabric. The physical properties of the pole were not as good as the physical properties of the first pole.

The fourth pole had a third layer of S-glass with toughened epoxy resin. The physical properties of the pole were not as good as the physical properties of the first pole.

The fifth pole had a third layer of unidirectional carbon tape with an additional layer of toughened epoxy film adhesive between the unidirectional carbon tape and the surrounding S-glass layer. The physical properties of the pole were not as good as the physical properties of the first pole.

The sixth pole had a third layer of unidirectional carbon tape. The physical properties of the pole were not as good as the physical properties of the first pole.

The results revealed that a pole having a third layer of UHP-glass has physical properties and durability that are better than poles having a third layer of other materials.

Example 2

This Example illustrates the effect of the use of UHP-glass in different layers in a vaulting pole made from seven layers of material.

Three poles were made. Each pole had seven layers of material.

The first pole had a first layer of helical E-glass tape, a second layer of crosswise helical E-glass tape, a third layer of UHP-glass body wrap, a fourth layer of S-glass body wrap, a fifth layer of carbon fiber body wrap, a sixth layer of S-glass body wrap, and a seventh layer of S-glass trapezoidal sail piece. The finished pole had exceptional physical properties and durability.

The second pole had a first layer of UHP-glass tape, a second layer of crosswise helical UHP-glass tape, a third layer of UHP-glass body wrap, a fourth layer of UHP-glass body wrap, a fifth layer of UHP-glass body wrap, a sixth layer of UHP-glass body wrap, and a seventh layer of UHP-glass trapezoidal sail piece. The finished pole was too soft with little recoil upon bending.

The third pole had a first layer of UHP-glass tape, a second layer of crosswise helical UHP-glass tape, a third layer of helical carbon weave tape, a fourth layer of UHP-glass body wrap, a fifth layer of carbon weave body wrap, a sixth layer of UHP-glass body wrap, and a seventh layer of UHP-glass trapezoidal sail piece. The finished pole was too soft with little recoil upon bending.

The results revealed that a pole having a third layer of UHP-glass without any other layers of UHP-glass has physical properties and durability that are better than poles having multiple layers of UHP-glass.

We claim:
1. A vaulting pole comprising:
(a) a first layer comprising a helical E-glass tape;
(b) a second layer comprising a crosswise helical E-glass tape;

(c) a third layer comprising a UHP-glass body wrap;
(d) a fourth layer comprising an S-glass body wrap;
(e) a fifth layer comprising a carbon fiber body wrap;
(f) a sixth layer comprising an S-glass body wrap; and
(g) a seventh layer comprising an S-glass trapezoidal sail piece.

2. The vaulting pole of claim 1 wherein the UHP-glass body wrap extends the entire length of the vaulting pole.

3. The vaulting pole of claim 1 wherein the UHP-glass body wrap makes at least two circumferences of the vaulting pole.

4. The vaulting pole of claim 1 wherein the carbon fiber body wrap is straight run carbon fiber body wrap.

\* \* \* \* \*